United States Patent

Koizumi

[11] Patent Number: 4,610,529
[45] Date of Patent: Sep. 9, 1986

[54] APPARATUS FOR RECORDING COLOR IMAGES

[75] Inventor: Yutaka Koizumi, Kawasaki, Japan
[73] Assignee: Ricoh Co., Ltd., Tokyo, Japan
[21] Appl. No.: 734,971
[22] Filed: May 16, 1985
[30] Foreign Application Priority Data

May 21, 1984 [JP] Japan .............................. 59-100651

[51] Int. Cl.⁴ .............................................. G03G 5/12
[52] U.S. Cl. ..................................... 355/4; 355/3 SH; 355/3 R
[58] Field of Search ..................... 355/4, 3 R, 3 SH

[56] References Cited

U.S. PATENT DOCUMENTS 3,976,373  8/1976  Kawakubo et al. ................. 355/3 R
4,162,843  7/1979  Inoue et al. ......................... 355/4

*Primary Examiner*—Arthur T. Grimley
*Assistant Examiner*—David Warren
*Attorney, Agent, or Firm*—Cooper, Dunham, Griffin & Moran

[57] ABSTRACT

An apparatus for recording color images of an original in color including three photosensitive drums capable of rotating in the normal direction and in the reverse direction. Each photosensitive drum has an outer peripheral surface of an area and an axial length large enough to accommodate an image of the original of a maximum size to which one of three color components of an optical image of the original obtained by color separation is written and developed into toner image of one of yellow, magenta and cyan. When the photosensitive drums are rotated in the normal direction, the three color components are written and developed; when the photosensitive drums are rotated in the reverse direction, a sheet of transfer material is fed at the same velocity as the peripheral velocity of the drums in the same direction as the direction of rotation of the drums and successively brought into contact with the photosensitive drums in their transfer-printing positions, to produce a color image of the original. Each photosensitive drum reverses the direction of its rotation in timed relation to the feeding of the sheet of support material in such a manner that the trailing end of the toner image on each photosensitive drum coincides with the leading end of the sheet of support material.

2 Claims, 2 Drawing Figures

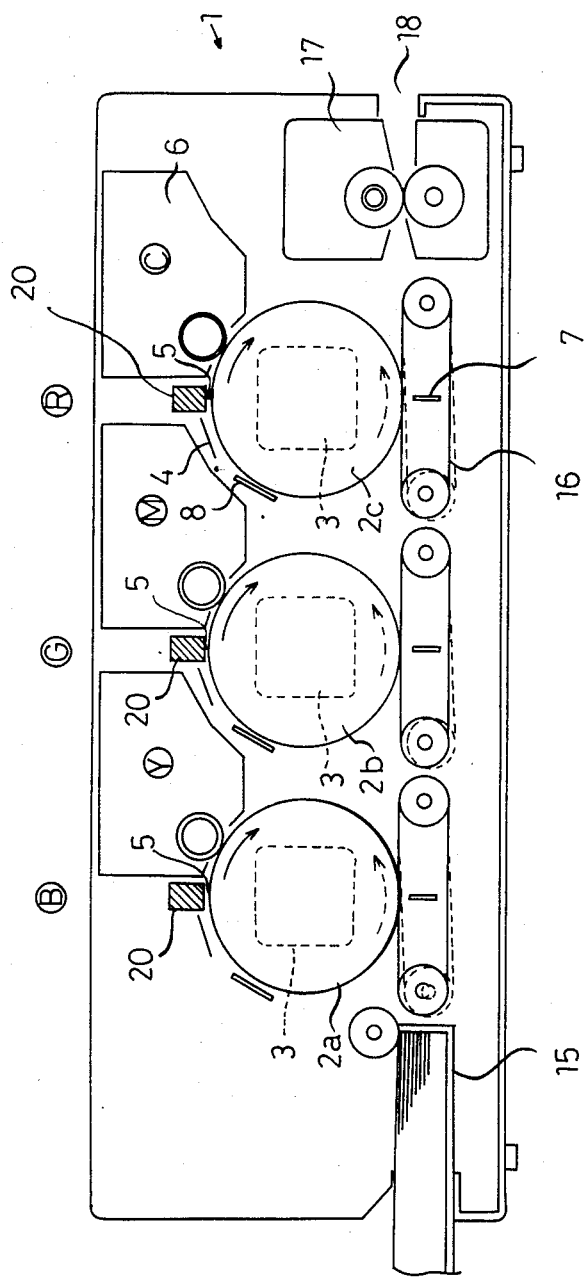

APPARATUS FOR RECORDING COLOR IMAGES

BACKGROUND OF THE INVENTION

This invention relates to an apparatus for recording color images, such as color copying apparatus, which is suitable for use in obtaining a color image of an original in color by writing optical images of three primary color components of the original in color each to the surface of one of three photosensitive drums, to form latent images on the photosensitive drums which are developed with toners of three primary colors by subtractive color mixing to produce three developed images which are then printed by transfer-printing on a sheet of support material by superposing the three developed images one over another, to provide the desired color image.

Apparatus for recording color images include a color copying apparatus for producing color copies from an original in color, a color printer for obtaining a color image by inputting digital signals for images of three colors obtained by color separation from an original in color, and a printout device of a color facsimile system, etc. In one type of these systems for recording color images known in the art, three photosensitive drums are each exposed to one of three optical images of an original in color produced by color separation by means of an optical system relying on slit exposure or exposed to one of three optical images of an original in color obtained by color separation by inputting a digital signal for each one of the three optical images to drive a respective optical writing head, to produce three electrostatic latent images on the three photosensitive drums which are developed with toners of three primary colors by a subtractive color mixing method to produce three toner images of different colors which are printed by transfer-printing on a sheet of support material by superposing them one over another to provide a color image of the original.

Generally, one of the most important requirements that should be met in color copying apparatus of the superposed image transfer-printing system is that deviation in position of color regions of the three developed images of different colors from each other should be avoided. To this end, an array of gradient-index rod lenses (GIRL) which enables an image of the same size as the original to be produced is used as an image forming optical system for projecting optical images on the photosensitive drums by moving the original, to ensure that the color image obtained is of the same size as the original. However, an image formed by an array of GIRL is a reversed image of the original in which the right side and the left side are reversed as is the case with a mirror image while an image formed by a single image forming lens is a reversed image of the original in which not only the right side and the left side but also the top side and the bottom side are reversed. Therefore, when an optical image is projected directly on each photosensitive member from the array of GIRL, it is necessary to move the peripheral surface of the photosensitive drum in the same direction as the original in the position in which the peripheral surface is exposed to the optical image, to form a continuous image of the original on the photosensitive drum. When an attempt is made to directly print the developed image from the photosensitive drum on a sheet of support material in a transfer-printing position which is diametrically opposed to the position in which the peripheral surface is exposed with respect to the center axis of the photosensitive drum, the direction in which the sheet of support material is conveyed is opposite the direction in which the original is moved. However, when the three photosensitive members have their peripheral surfaces exposed to optical images of an original with a suitable time lag in positions which correspond to each other while the original is moved above the photosensitive drums, it is impossible to superpose three toner images of different colors one over another unless they are transferred from the photosensitive drums to a sheet of support material with a suitable time lag while moving the sheet of support material in the same direction as the original.

It has hitherto been usual practice to insert a mirror between the end of each array of GIRL through which a light ray emerges and the position on each photosensitive drum in which the photosensitive drum is exposed to the optical image so as to reverse the direction of movement of the optical image, the mirror being constructed in the form of a multilayer mirror to serve concurrently as a color separator. However, when this type of mirror is used, the image formed on each photosensitive drum is a normal image, so that when the image is developed and directly printed on a sheet of support material, a color image of the original produced on the sheet of support material is reversed from the image of the original. Thus, it has hitherto been necessary to use an intermediate transfer-printing member to which the image is transferred temporarily from the photosensitive drum before all the images are printed by transfer-printing on a sheet of support material by superposing one over another to produce the desired color image of the original. This has made the apparatus complex in construction and large in size, causing a rise in cost.

In the case of a color printer or a color facsimile system in which optical writing heads are driven when digital signals are inputted thereto to write optical images to three photosensitive drums, signals for the three primary colors are usually taken out simultaneously for forming toner images of three different colors each on one of the three photosensitive drums, and the toner images of different colors thus formed are printed by transfer-printing on a sheet of support material which is fed in a manner to be brought successively into contact with the positions on the three photosensitive drums in which the three toner images of different colors are formed. To perform the operation described hereinabove, it is necessary that the optical images be written on the three photosensitive drums with a suitable time lag and a memory for storing the signals for the different colors temporarily must be provided. Such memory is very expensive, causing a rise in the cost of the apparatus.

SUMMARY OF THE INVENTION

This invention has been developed for the purpose of obviating the aforesaid disadvantages of the color copying apparatus and color printers of the prior art. Accordingly, the invention has as its object the provision of an apparatus for recording color images, simple in construction, small in size and low in cost, which is capable of eliminating a deviation in position of color regions of toner images of three different colors from each other when they are printed by transfer-printing on a sheet of support material.

To accomplish the aforesaid object, the invention provides the following features: three photosensitive drums are used which each have an outer peripheral surface of an area and an axial length large enough to accommodate an image of an original in color of a maximum size and which can be rotated both in the normal direction and in the reverse direction; each of the photosensitive drums is rotated in the normal direction when an optical image of a different color component of the original is written by color separation to each photosensitive drum to form a latent image which is developed into a toner image; each photosensitive drum is rotated in the reverse direction when each toner image is printed by transfer-printing on a sheet of support material which is fed at the same velocity and in the same direction as the outer peripheral surface of each photosensitive drum while being successively brought into the position on each photosensitive drum in which the respective toner image is formed; and the reversing of the direction of rotation of each photosensitive drum and the timing with which the sheet of support material is fed are controlled in such a manner that the trailing end of an image on each photosensitive drum coincides with the leading end of the sheet of support material, to produce a color image of the original by superposing three toner images of different colors on the sheet of support material.

BRIEF DESCRIPTION OF THE DRAWINGS

FIG. 2 is a sectional view of an apparatus for recording color images comprising another embodiment of the invention as incorporated in a color printer.

DESCRIPTION OF THE PREFERRED EMBODIMENTS

Figure 1:
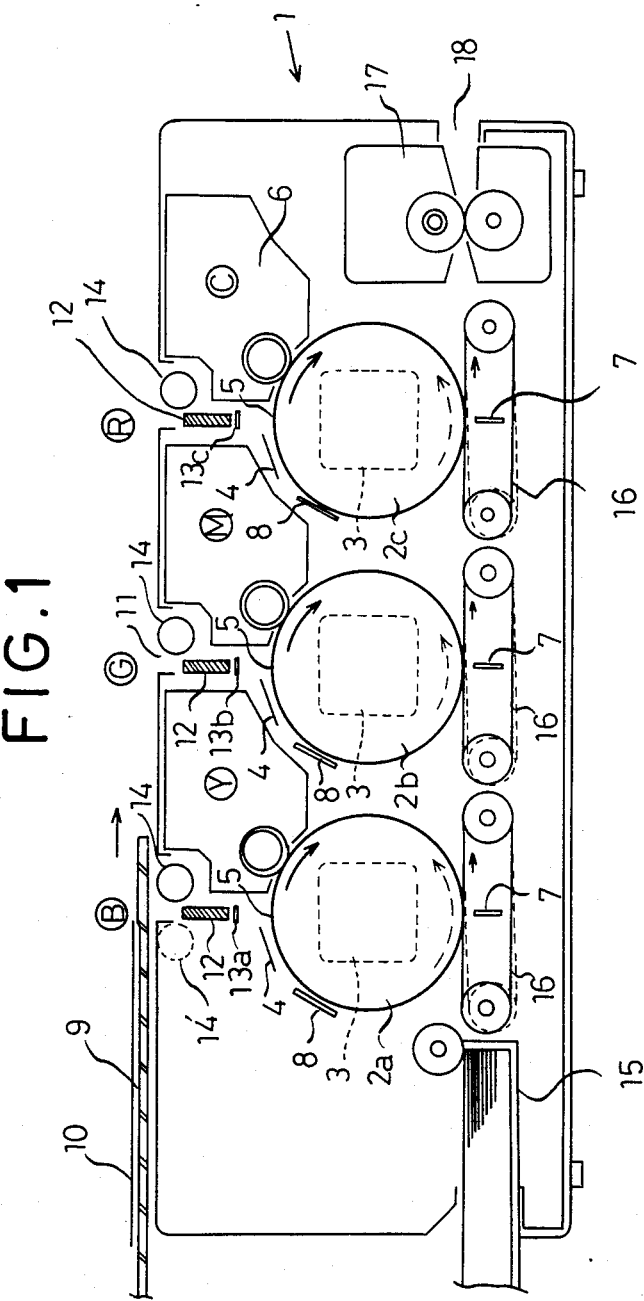
FIG. 1 is a sectional view of an apparatus for recoding color images comprising one embodiment of the invention as incorporated in a color copying apparatus.

Preferred embodiments of the apparatus for recording color images in conformity with the invention will now be described by referring to the accompanying drawings.

Referring to FIG. 1, a copying apparatus generally designated by the reference numeral 1 comprises three photosensitive drums 2a, 2b and 2c of the same size. Each of the three photosensitive drums 2a, 2b and 2c has an outer peripheral surface of an area and an axial length large enough to accomodate an image of an original of a maximum size. Each of the photosensitive drums 2a, 2b and 2c has a built-in motor 3 which drives each photosensitive drum to rotate both in a normal direction (clockwise) indicated by a solid-line arrow and in a reverse direction (counterclockwise) indicated by a broken-line arrow. Located clockwise around each of the photosensitive drums 2a, 2b and 2c are a charger 4, an exposing position 5, a developing device 6 serving concurrently as a cleaning device, a transfer-printing charger 7 and a quenching device 8. The developing device 6 for each of the photosensitive drums 2a, 2b and 2c contains a developing agent including a toner of one of the three primary colors for subtractive color mixing or yellow, magenta and cyan. A glass member 9 for supporting an original 10 is located at the top of the copying apparatus 1 for movement transversely or leftwardly and rightwardly in FIG. 1. The original 10 is placed on the glass member 9. An opening 11 of a suitable width is formed at a top plate of the copying apparatus 1 in a position which is immediately above the exposing position 5 of each of the photosensitive members 2a, 2b and 2c. An array of gradient-index rod lenses (GIRL) 12 and a color separator 13 (13a, 13b, 13c) are located in each opening 11 between the path of travel of the original supporting glass member 9 and the exposing position 5 of each of the photosensitive drums 2a, 2b and 2c, and a lamp 14 is located in a position immediately above the array of GIRL 12 in which it is capable of irradiating the original 10.

The color separators 13a, 13b and 13c for the photosensitive drums 2a, 2b and 2c are for transmitting a blue components, a green component and a red component, respectively, of an optical image of the original 10 to the respective photosensitive drums. The blue component of the optical image transmitted through the color separator 13a is smaller in the quantity of light than other color components transmitted through the color separators 13b and 13c. Thus, an auxiliary light source 14' for exposing the photosensitive drum 13a to an additional beam of light for the blue color component is preferably mounted as indicated by a broken line. A sheet feeding device 15 is located on the left side of a main body of the copying apparatus 1, and three transfer-printing belts 16 which are of the endless conveyor belt type are located in a row adjacent the sheet feeding device 15 to convey a sheet of support material fed from the sheet feeding device 15 successively into and out of contact with the three photosensitive members 2a, 2b and 2c. The transfer-printing belts 16 which are constructed to be brought into and out of contact at their upper runs with the respective photosensitive drums 2a, 2b and 2c bring the sheet of support material successively into contact with the transfer-printing positions on the outer peripheral surfaces of the photosensitive drums 2a, 2b and 2c to which the respective transfer-printing chargers 7 are located in face-to-face relation. Located adjacent the transfer-printing belt 16 on the right side of the main body of the copying apparatus 1 is a fixing device 17 for fixing the toner images printed on the sheet of support material as the latter is conveyed by the transfer-printing belts 16, before the sheet of support material having a desired color image of the original 10 printed thereon is ejected through a sheet ejection opening 18 from the copying apparatus 1 to the outside.

The operation of performing the copying of an original in color by the copying apparatus of the aforesaid construction will now be described.

In step 1, the photosensitive drums 2a, 2b and 2c are driven by the respective motors 3 for rotation in the normal direction, and the glass member 9 for supporting the original 10 thereon is moved rightwardly in FIG. 1 so that the original 10 is successively irradiated by the lamps 14 and three optical images of the original 10 are successively formed by the respective arrays of GIRL 12. A blue component, a green component and a red component of the three optical images of the original 10 are transmitted through the color separators 13a, 13b and 13c and form images of the same size as the original on the outer peripheral surfaces of the photosensitive drums 2a, 2b and 2c, respectively, as the three color components are projected on to the respective photosensitive drums. Before the photosensitive drums 2a, 2b and 2c are exposed to the three color components of the optical images, quenching and charging are performed by the respective quenching devices 8 and charging devices 4, so that electrostatic latent images are formed on the outer peripheral surfaces of the photosensitive drums 2a, 2b and 2c as the three color components of the original 10 are projected on to the photosensitive drums 2a, 2b and 2c. The electrostatic latent images on the outer peripheral surfaces of the photosensitive drums 2a, 2b and 2c are developed by the respective developing devices 6 serving concurrently as the cleaning devices, with a result that toner images of yellow, magenta and cyan are formed on the outer peripheral surfaces of the photosensitive drums 2a, 2b and 2c, respectively. In this step, the upper runs of the transfer-printing belts 16 are out of contact with the respective photosensitive drums 2a, 2b and 2c, and the transfer-pringing chargers 7 and sheet feeding device 15 remain inoperative. Thus, the toner images of three different primary colors are held on the outer peripheral surfaces of the photosensitive drums 2a, 2b and 2c.

In step 2 or a transfer-printing step, the photosensitive drums 2a, 2b and 2c are rotated in the reverse direction or counterclockwise. The chargers 4 are inoperative but the quenching devices 8 are rendered operative. The developing devices 6 serving concurrently as cleaning devices are actuated to perform a second developing operation to cause the toners to adhere to solid portions of the images and increase scavenging effects achieved in the background of the image regions. Meanwhile, a sheet of support material is fed from the sheet feeding device 15 in timed relation to the rotation of the photosensitive drums 2a, 2b and 2c such that a leading end of the sheet of support material is brought into coincidence with a trailing end of each toner image on each photosensitive drum in the transfer-printing position. As the leading end of the sheet of support material draws near the transfer-printing position in a lower portion of each photosensitive drum 2a, 2b, 2c, the upper run of each transfer-printing belt 16 is moved to a position in which the sheet of support material is brought into contact with the photosensitive drum and at the same time each transfer-printing charger 7 is rendered operative, so that the toner image on the photosensitive drum 2a, 2b, 2c is printed by transfer-printing on the sheet of support material. After the three toner images have been printed on the sheet of support material, the outer peripheral surface of the photosensitive drums 2a, 2b and 2c are cleaned so that the residual toner particles are recovered by developing rollers. The upper runs of the transfer-printing belts 16 are brought out of contact with the outer peripheral surfaces of the photosensitive drums 2a, 2b and 2c after finishing conveying the sheet of support material, to avoid the soiling of the belts 16. After being cleaned as described hereinabove, the outer peripheral surface of each photosensitive drum 2a, 2b, 2c is cleaned again as it continues to rotate counterclockwise while the glass member 9 for supporting the original 10 is restored to its original position.

As described hereinabove, the developing of the toner images and the cleaning of the outer peripheral surface of each photosensitive drum are performed twice as the copying of an original is performed once. Thus, the copying process performed by the recording apparatus according to the invention can achieve good results.

The toner images of yellow, magenta and cyan are formed on the outer surfaces of the photosensitive drums 2a, 2b and 2c respectively with a time lag corresponding to the time required for the sheet of support material to cover the distance between the axes of the two adjacent photosensitive drum to move from one transfer-printing position to the next following transfer-printing position, so that the three toner images are superposed one over another on the sheet of support material and printed to produce a color image of the original 10. The color image of the original 10 formed on the sheet of support material is fixed by the fixing device 17 and ejected to outside from the copying apparatus through the sheet ejecting opening 18.

Although not shown, there are provided shutter means for blocking bright light directed from above against the photosensitive drums when developing is performed, means for removing an electrical charge from the toner particles or controlling the porality of the toner particles remaining on the photosensitive drums without being transferred to the sheet of support material, a drive and synchronizing unit for each station and means for cleaning the transfer-printing belts and removing an electrical charge therefrom, if necessary.

FIG. 2 shows a color printer in which the present invention has application. The color printer shown in FIG. 2 is distinct from the copying apparatus 1 shown in FIG. 1 in the exposing device. In the color printer shown in FIG. 2, a writing head 20 is located above each of the three photosensitive drums 2a, 2b and 2c, in place of the glass member 9 for supporting the original 10 thereon, the array of GIRL 12, the color separator 13a, 13b, 13c and the lamp 14. The writing head 20 may comprise an array of light emitting diode, an array of liquid crystal shutters or an array of fluorescent tubes. Other parts of the color printer shown in FIG. 2 are similar to those of the copying apparatus 1 shown in FIG. 1. Thus, in FIG. 2, parts similar to those shown in FIG. 1 are designated by like reference characters.

In the exposing step, image information signals for one position after another of the blue, green and red components of an original in color obtained by color separation of an optical image of the original are simultaneously inputted to the writing heads 20 which emit light beams in accordance with the signals to write information on the outer peripheral surfaces of the photosensitive drums 2a, 2b and 2c which are driven to rotate in the normal direction (clockwise), to form electrostatic latent images corresponding to the three color components of the original on the photosensitive drums 2a, 2b and 2c. The electrostatic latent images are developed by the respective developing devices 6 serving concurrently as cleaning devices into toner images of yellow, magenta and cyan which are retained on the photosensitive drums 2a, 2b and 2c.

In the transfer-printing step, the photosensitive drums 2a, 2b and 2c are driven to rotate in the reverse direction (counterclockwise), and a sheet of support material is fed from the sheet fedding device 15 to the transfer-printing belts 16, so that each toner image is printed on the sheet of support material in a transfer-printing position of one of the three photosensitive drums 2a, 2b and 2c in which the sheet of support material is brought into contact with the respective photosensitive drum. In this embodiment, the images are simultaneously written on the outer peripheral surfaces of the photosensitive drums. Therefore, to allow the three toner images of different colors to be printed on the sheet of support material in superposed relation one over another, each photosensitive drum is made to reverse the direction of its rotation with a time lag corresponding to the time required for the sheet of support material to reach the transfer-printing position of each photosensitive drum. In this embodiment, the need to provide a memory for temporarily storing the image signals for the components of different colors of the original is eliminated, so that the color printer incorporating the present invention is low in cost and yet capable of performing a printing operation at high speed. The invention can be incorporated in a receiving device of a color facsimile system.

In the preferred embodiments shown and described hereinabove, the photosensitive drums have been used. However, it is to be understood that the invention is not limited to this specific form of photosensitive members, and that the photosensitive members may be in the form of endless belts, webs or sheets without departing from the scope of the invention.

In the preferred embodiments shown and described hereinabove, the photosensitive drums are rotated in the normal direction (clockwise) when images are formed thereon and rotated in the reverse direction (counterclockwise) when the images are printed by transfer-printing on a sheet of support material. However, the invention is not limited to this specific mode of rotation of the photosensitive drums and the drums may be rotated only in the normal direction by changing the positions of the sheet feeding device and the fixing device. When this is the case, each photosensitive drum has a toner image of one color formed thereon during the first rotation, and actuated for the second rotation with a phase difference to have the toner image on each photosensitive drum printed successively on the sheet of support material which is fed from the sheet feeding device located in the position in which the fixing device is located in FIG. 1 and 2 to start transfer-printing with the photosensitive drum 2c. In this case, it is necessary that the distance between the center axes of the adjacent photosensitive drums be over $\pi d/2$ where d is the diameter of the drums.

From the foregoing description, it will be appreciated that the invention provides a color recording apparatus of high operation speed and simple construction which is capable of matching different color images with each other.

What is claimed is:

1. An apparatus for recording color images, comprising:

three photosensitive members and means for selectively driving each in a normal direction and a reverse direction;

means for forming on each one of said three photosensitive members a latent image of a respective one of three color components of an optical image of an original in color obtained by color separation;

means for developing the latent image of each photosensitive member with a toner of a respective one of three primary colors by a subtractive color mixing method to produce three toner images of different colors; and means for printing by transfer-printing on a sheet of support material the three toner images of different colors by superposing them one over another to produce a color image of the original;

wherein each photosensitive member has an area and an axial length large enough to accommodate an image of an original of a selected maximum size, and wherein when the photosensitive members are each driven in the normal direction, the three color components of the optical image of the original in color are formed on the respective photosensitive members as latent images which are developed by the developing means into toner images of different colors retained on the respective photosensitive members and, when the photosensitive members are each driven in the reverse direction, a sheet of transfer material is fed at the same velocity and direction as the velocity and direction of the photosensitive members and successively brought into contact with the photosensitive members in their transfer-printing positions to print by transfer-printing the toner images of three different colors on the sheet of support material by superposing them one over another to produce a color image of the original in color, each of said photosensitive members reversing its direction in timed relation to the feeding of the sheet of support material in such a manner that the trailing end of the toner image on each of said photosensitive members coincides with the leading end of the sheet of support material.

2. An apparatus as in claim 1 in which each photosensitive member is a drum having a photosensitive outer periphery, and said normal direction is rotation of the drum in one direction and said reverse direction is rotation of the drum in the opposite direction.

* * * * *